United States Patent [19]

Moe

[11] 4,222,218
[45] Sep. 16, 1980

[54] FLOATING DRIVE GEAR FOR CROP HARVESTING APPARATUS

[75] Inventor: Richard G. Moe, LaPorte, Ind.

[73] Assignee: Allis-Chalmers Corporation, Milwaukee, Wis.

[21] Appl. No.: 60,508

[22] Filed: Jul. 25, 1979

[51] Int. Cl.³ .................... A01D 45/02; A01D 69/06
[52] U.S. Cl. .................................. 56/104; 56/98; 130/5 H
[58] Field of Search ............... 56/104, 105, 106, 112, 56/98, 107, 108, 109, 110, 111; 130/5 R–5 J

[56] References Cited

U.S. PATENT DOCUMENTS

| | | | |
|---|---|---|---|
| 2,881,579 | 4/1959 | Aasland | 56/104 |
| 3,462,928 | 8/1969 | Schreiner et al. | 56/104 |
| 3,600,876 | 8/1971 | Tanzer | 56/104 |
| 3,759,021 | 9/1973 | Schreiner et al. | 56/106 |
| 3,858,384 | 1/1975 | Maiste et al. | 56/104 |

Primary Examiner—Paul J. Hirsch
Attorney, Agent, or Firm—Charles L. Schwab

[57] ABSTRACT

A single row corn harvesting unit of a normally multiple unit corn head adapted to be mounted at the forward end of a crop harvesting combine and comprising a pair of "snapping rolls" or stalk rolls extending forwardly in cantilever fashion in contiguous relation to each other from a gear subassembly, the snapping rolls cooperating with each other in the corn harvesting operation. The rearward end of each snapping roll has a driven bevel gear mounted thereon, the two driven bevel gears comprising part of the gear subassembly. A drive shaft is suitably mounted for rotation and a double bevel gear which also forms part of the gear subassembly is mounted on the drive shaft. The double bevel gear has opposed gear faces each respectively adapted to drivingly engage a corresponding driven bevel gear on one of said respective snapping rolls. The double bevel gear has a spline on the inner periphery thereof and the portion of the axial length of the drive shaft which receives the double bevel gear has a spline on the outer periphery thereof which is adapted to receive and to mate with the spline on the inner periphery of the double bevel gear, whereby the double bevel gear is freely slidable along the spline on the drive shaft to permit the double bevel gear to automatically center itself with respect to the driven bevel gears on the snapping rolls.

1 Claim, 3 Drawing Figures

FLOATING DRIVE GEAR FOR CROP HARVESTING APPARATUS

TECHNICAL FIELD

This invention relates to crop harvesting apparatus and more particularly to an improved drive arrangement for the corn harvesting rolls or "snapper rolls" of a single row corn harvesting unit of a normally multiple unit corn harvesting head for a crop harvesting combine.

DESCRIPTION OF THE PRIOR ART

It is known in the prior art to provide a corn harvesting head which is mounted as an attachment on the forward end of a crop harvesting combine, the corn harvesting head normally including a plurality of single row corn harvesting units. Each single row corn harvesting unit of the normally multiple unit corn head includes a pair of stalk rolls or "snapping" rolls with associated stripper plates and trash knives. The two snapping rolls of each single row corn harvesting unit are spaced to define therebetween a fore and aft extending stalk passage which receives the corn stalks. The two snapping rolls of each single row corn harvesting unit are provided with blades which operate to grip the stalks and draw them downwardly between the associated stripper plates or bars until the ears of corn contact the bars and are detached from the stalks. The following United States patents show corn harvesting devices of the general type just described:

U.S. Pat. No. 3,831,356 issued to Arved Maiste et al on Aug. 27, 1974; and

U.S. Pat. No. 3,858,384 issued to Arved Maiste et al on Jan. 7, 1975.

In the prior art, as represented by the foregoing patents, each of the two snapping rolls of a given single row unit is provided with a bevel gear and the two snapping rolls of the given unit are driven by a double bevel gear which mates with the bevel gear of each respective snapping roll of the given single row unit. The double bevel gear of the prior art is fixed precisely to the drive shaft and shims are used to achieve equal spacing and equal loads of the double bevel gear relative to the bevel gears on the respective snapping rolls. This prior art arrangement requires time consuming assembly techniques and is subject to human error in obtaining proper spacing and loading of the double bevel driving gear relative to the respective driven bevel gears on the snapper rolls.

STATEMENT OF THE INVENTION

Accordingly, it is an object of the present invention to provide an improved drive arrangement for the corn harvesting rolls or "snapping rolls" of a single row corn harvesting unit of a normally multiple unit corn harvesting head for a crop harvesting combine.

It is a further object of the invention to provide in combination with the corn harvesting snapping rolls of a single row corn harvesting unit of a normally multiple unit corn harvesting head on a crop harvesting combine an improved drive arrangement including a double bevel gear which drivingly engages two opposed driven bevel gears without the need for precise adjustments or close tolerances between the double bevel gear and the two opposed driven bevel gears.

It is a further object of the invention to provide a gear drive arrangement for a pair of cooperating corn harvesting stalk rolls or "snapping rolls" of a single row corn harvesting unit of a normally multiple unit corn head on a crop harvesting combine of the type in which a double bevel gear drivingly engages two driven bevel gears carried by the respective snapper rolls, but which eliminates the time consuming assembly techniques required in the prior art to obtain equal spacing and loading of the double bevel drive gear relative to the opposed driven bevel gears.

It is a further object of the invention to provide a pair of cooperating snapping rolls on a single row corn harvesting unit of a normally multiple unit corn harvesting head of a crop harvesting combine, in which power is transmitted from a double bevel driving gear to a pair of opposed driven bevel gears with uniform loading and gear clearances between the double bevel gear and each of the driven bevel gears and without the necessity for precise backlash adjustments between the double bevel driving gear and the driven bevel gears.

SUMMARY OF THE INVENTION

In achievement of these objectives, there is provided in accordance with the invention a single row corn harvesting unit of a normally multiple unit corn head adapted to be mounted at the forward end of a crop harvesting combine and comprising a gear subassembly, a pair of snapping rolls extending forwardly from said gear subassembly in contiguous relation to each other, said snapping rolls cooperating with each other in the corn harvesting operation, each of said snapping rolls having a driven bevel gear mounted on the rearward end thereof, means for rotatably driving said snapping rolls comprising a drive shaft, a double bevel gear mounted on said drive shaft, said double bevel gear having opposed gear faces each respectively adapted to drivingly engage a corresponding bevel gear on one of said respective snapping rolls, said double bevel gear having a spline on the inner periphery thereof, the portion of the axial length of said drive shaft which receives said double bevel gear having a spline on the outer periphery thereof which is adapted to receive and mate with said spline on the inner periphery of said double bevel gear, whereby said double bevel gear is freely slidable along the spline on said drive shaft to permit said double bevel gear to automatically center itself with respect to said driven bevel gears on said snapping rolls.

Further objects and advantages of the invention will become apparent from the following description taken in conjunction with accompanying drawings in which:

DESCRIPTION OF THE PREFERRED EMBODIMENT

Figure 1:
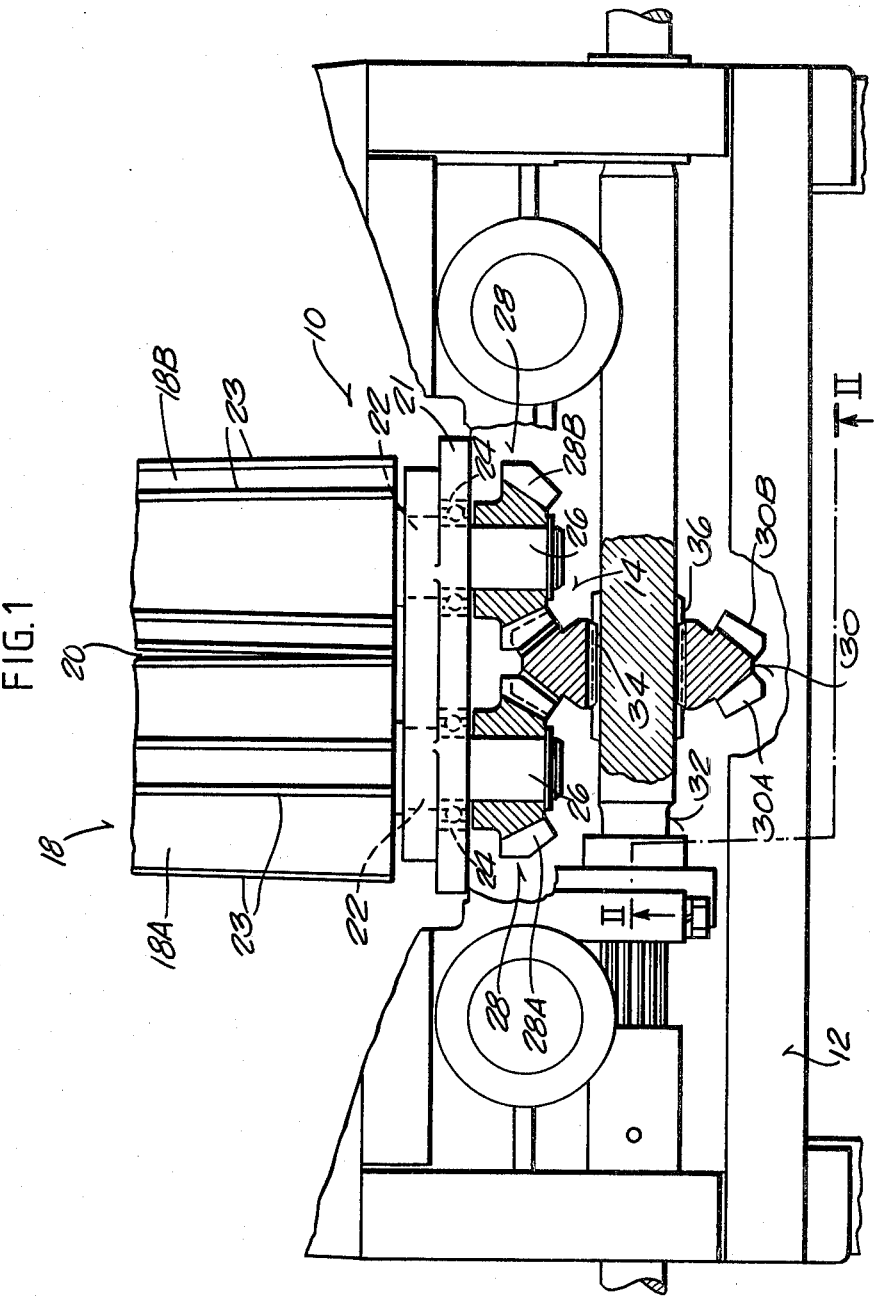
FIG. 1 is a top plan view, partially in section, showing a single row corn harvesting unit of a normally multiple unit corn head attachment mounted on the forward end of a crop harvesting combine, the single row unit including a pair of cooperating snapper rolls which are driven by the improved gear drive arrangement of the invention.
Figure 2:
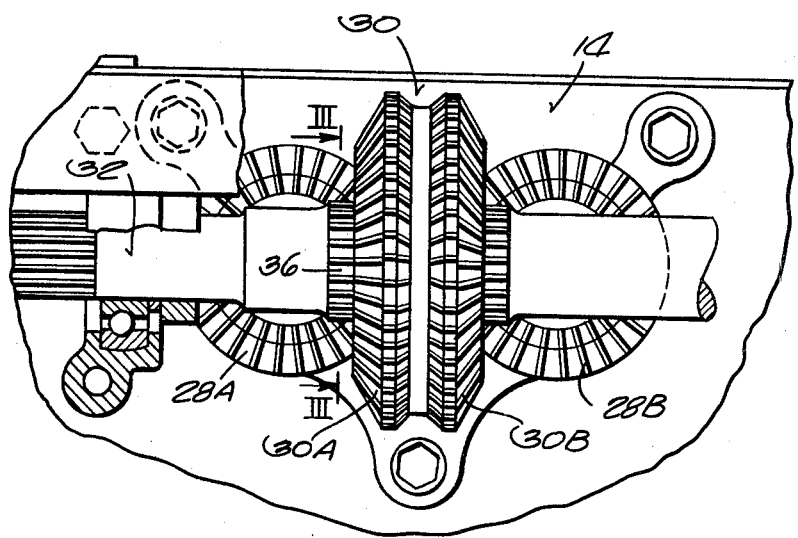
FIG. 2 is a view taken along line II—II of FIG. 1.
Figure 3:
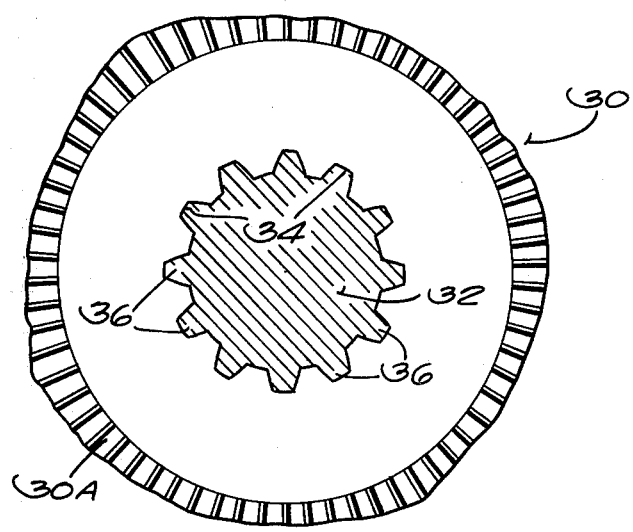
FIG. 3 is a view taken along line III—III of FIG. 2.

Referring now to the drawings, there is shown a single row corn harvesting unit generally indicated at 10 which is suitably supported from a cross beam 12 which constitutes part of the forward framing of a crop harvesting combine or which is attached to the combine so as to extend transversely of the path of travel of the combine during the harvesting operation. The single row corn harvesting unit 10 is normally one unit of a plurality of such units of a normally multiple unit corn head carried by the forward end of a crop harvesting combine. The single row corn harvesting unit 10 includes at its rearward or trailing end a gear subassembly generally indicated at 14 which drives a pair of contiguous stalk rolls or "snapping" rolls generally indicated at 18 and specifically indicated at 18A and 18B. The spacing between the rolls 18A and 18B is such that a path 20 is provided for passage of the corn stalks therebetween. The snapping rolls 18A and 18B are of substantially identical construction except for being right-hand and left-hand. Snapping rolls 18 extend in a cantilever fashion forwardly of the forward wall of a bearing plate 21 which in turn is suitably mounted on the single row corn harvesting unit 10. Each of the rolls 18 includes a roll shaft 22 which is suitably supported at its rearward end by a corresponding bearing assembly 24 carried by bearing plate 21.

The roll shaft 22 of each of the snapping rolls 18 has a plurality of radially extending blades 23 which are peripherally spaced from each other and the blades 23 of the two roll shafts 22 coact to grip the corn stalks and draw the stalks downwardly between the associated stripper plates or bars (not shown) until the ears of corn contact the bars and are detached from the stalks, in a manner well known in the art, and in a manner generally similar to that described in the aforementioned U.S. Pat. No. 3,858,384 of Arvid Maiste et al. The trailing or rear end 26 of each of the roll shafts 22 extends through bearing plate 21 and has mounted thereon a bevel gear generally indicated at 28 and specifically indicated at 28A and 28B. The two bevel gears 28A and 28B are driven by a double bevel gear generally indicated at 30 including a bevel gear or gear face 30A which is adapted to mesh with and drivingly engage the bevel gear 28A carried by snapping roll 18A. The double bevel gear 30 also includes an oppositely disposed bevel gear or gear face 30B which mates with and drivingly engages bevel gear 28B of snapping roll 18B. Double bevel gear 30 is mounted on a shaft generally indicated at 32 which is driven in any suitable manner, shaft 32 normally being suitably driven from the output of the prime mover which supplies power for the operation of the combine.

In accordance with an important feature of the invention, the internal periphery of double bevel gear 30 is splined as indicated at 34 and the outer periphery of shaft 32 is provided on the portion of its length in the vicinity of bevel gears 28A, 28B with a spline 36 which receives and meshes with the internal spline 34 of double bevel gear 30. The internal spline 34 on double bevel gear 30 and the external spline 36 on shaft 32 permit a free sliding movement of double bevel gear 30 on splined shaft 32, whereby double bevel gear 30 is free floating between the two bevel gears 28A and 28B carried by the respective snapper rolls 18A and 18B. Thus, double bevel gear 30 is not fixed at a precise location on shaft 32 as in the prior art, but rather is free floating on shaft 32 due to the splined engagement between double bevel gear 30 and shaft 32. The freely slidable splined engagement of double bevel gear 30 with shaft 32 permits double bevel gear 30 to be automatically self-centering or self-aligning with respect to the opposed driven bevel gears 28A and 28B of the respective snapper rolls 18A and 18B and provides uniform loadings and uniform gear clearances of the two driven bevel gears 28A and 28B relative to driving gear 30 without the need for the time consuming assembly techniques and precise adjustments required by the prior art and which are subject to human error.

In the normal crop harvesting combine, the support beam 12 will have a length sufficient to support a plurality of the single row corn harvesting units 10, and input power shaft 32 will be of sufficient length to accommodate the number of units 10 employed.

From the foregoing detailed description of the invention, it has been shown how the objects of the invention have been obtained in a preferred manner. However, modifications and equivalents of the disclosed concepts, such as readily occur to those skilled in the art, are intended to be included within the scope of this invention.

The embodiments of the invention in which an exclusive property or privilege is claimed are defined as follows:

1. A single row corn harvesting unit adapted to be mounted at the forward end of a harvesting combine and comprising a gear subassembly, a pair of snapping rolls extending forwardly from said gear subassembly in contiguous relation to each other, said snapping rolls cooperating with each other in the corn harvesting operation, each of said snapping rolls having a driven bevel gear mounted on the rearward end thereof, means for rotatably driving said snapping rolls comprising a drive shaft, a double bevel gear mounted on said drive shaft, said double bevel gear having opposed gear faces each respectively adapted to drivingly engage the corresponding driven bevel gear on one of said respective snapping rolls, said double bevel gear having a spline on the inner periphery thereof, the portion of the axial length of said drive shaft which receives said double bevel gear having a spline on the outer periphery thereof which is adapted to receive and mate with said spline on the inner periphery of said double bevel gear, whereby said double bevel gear is freely slidable along the spline on said drive shaft to permit said double bevel gear to automatically center itself with respect to said driven bevel gears on said snapping rolls.

* * * * *